US006836826B2

(12) United States Patent
Sharma

(10) Patent No.: US 6,836,826 B2
(45) Date of Patent: *Dec. 28, 2004

(54) MULTILEVEL CACHE SYSTEM AND METHOD HAVING A MERGED TAG ARRAY TO STORE TAGS FOR MULTIPLE DATA ARRAYS

(75) Inventor: Vinod Sharma, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/600,715

(22) Filed: Jun. 23, 2003

(65) Prior Publication Data

US 2004/0030834 A1 Feb. 12, 2004

Related U.S. Application Data

(63) Continuation of application No. 09/540,754, filed on Mar. 31, 2000, now Pat. No. 6,591,341.

(51) Int. Cl.[7] .............................................. G06F 12/00
(52) U.S. Cl. ........................... 711/122; 711/3; 711/124; 711/128; 711/144; 711/146; 711/156
(58) Field of Search ................................ 711/122, 124, 711/144, 146, 156, 3, 128

(56) References Cited

U.S. PATENT DOCUMENTS

| 4,442,487 A | * | 4/1984 | Fletcher et al. ............. 711/122 |
|---|---|---|---|
| 5,506,967 A | * | 4/1996 | Barajas et al. .............. 711/118 |
| 5,553,263 A | * | 9/1996 | Kalish et al. ............... 711/127 |
| 5,604,882 A | * | 2/1997 | Hoover et al. .............. 711/121 |
| 5,623,627 A | * | 4/1997 | Witt ........................... 711/122 |
| 5,649,139 A | * | 7/1997 | Weinreb et al. ............. 711/202 |
| 5,692,152 A | * | 11/1997 | Cohen et al. ............... 711/140 |
| 5,699,551 A | * | 12/1997 | Taylor et al. ............... 711/207 |
| 5,796,980 A | * | 8/1998 | Bowles ....................... 711/144 |
| 5,802,578 A | * | 9/1998 | Lovett ........................ 711/147 |
| 5,813,034 A | * | 9/1998 | Castle et al. ................ 711/146 |
| 5,895,487 A | * | 4/1999 | Boyd et al. ................. 711/122 |
| 6,108,764 A | * | 8/2000 | Baumgartner et al. ....... 712/28 |
| 6,115,804 A | * | 9/2000 | Carpenter et al. ........... 712/28 |
| 6,122,709 A | * | 9/2000 | Wicki et al. ................ 711/118 |
| 6,223,260 B1 | * | 4/2001 | Gujral et al. ............... 711/145 |
| 6,275,907 B1 | * | 8/2001 | Baumgartner et al. ...... 711/143 |
| 6,591,341 B1 | * | 7/2003 | Sharma ...................... 711/122 |

OTHER PUBLICATIONS

Lee et al., "Shared tag for MMU and cache memory," pp 77–80, CAS '97 Proceedings, vol. 1, IEEE, Oct. 1997.*

Lee et al., "Indirectly–compared cache tag memeory using a shared tag in a TLB," pp 1764–1766, Electronics Letters, vol. 3, No. 21, Oct. 1997.*

* cited by examiner

Primary Examiner—Stephen Elmore
(74) Attorney, Agent, or Firm—Kenyon & Kenyon

(57) ABSTRACT

A multilevel cache system and method. A first data array and a second data array are coupled to a merged tag array. The merged tag array stores tags for both the first data array and second data array.

19 Claims, 7 Drawing Sheets

MULTILEVEL CACHE SYSTEM AND METHOD HAVING A MERGED TAG ARRAY TO STORE TAGS FOR MULTIPLE DATA ARRAYS

CROSS-REFERENCE TO RELATED APPLICATION

This application claims the benefit as a continuation of U.S. application Ser. No. 09/540,754, filed Mar. 31, 2000 (issued as U.S. Pat. No. 6,591,341), which application is incorporated herein in its entirety.

FIELD OF THE INVENTION

Embodiments of the present invention provide a multilevel cache system and method. In particular, the present invention relates to a cache system that has multiple cache hierarchies.

BACKGROUND

Many computer, systems use multiple levels of caches to cache data from a memory device. For example, a computer system may have a level one cache (L1) and a larger level two cache (L2), in addition to an even larger RAM memory. The L1 cache typically contains a copy of information that was previously loaded from RAM by the processor, and the L2 cache typically contains both a copy of information in the L1 cache and other information that had been loaded from RAM by the processor less recently than the information in the L1 cache.

Each of the caches in such computer systems contain a data array, which stores information copied from the memory, and a tag array, which stores a directory of the information that is contained in the corresponding data array. Using the example above, the system would have an L1 data array, an L1 tag array that contains a directory of information in the L1 data array, an L2 data array, and an L2 tag array that contains a directory of information in the L2 data array. In addition, many computer systems also have multiple translation lookaside buffers (TLB). The TLBs may be used to implement the virtual address system (e.g., to translate from virtual addresses to physical addresses) and to prevent programs from accessing protected areas of memory.

When the processor in the example system described above issues a memory load request, this request is broadcast to the L1 cache system, including the L1 TLB, L1 tag array, and L1 data array. The L1 tag array is examined to determine if the requested information is in the L1 data array. If the requested information is in the L1 data array, the information is returned from the L1 data array to the processor. If a search of the L1 tag array indicates that the information is not in the L1 cache, then a cache miss is forwarded to the L2 cache. This causes a request to be sent to the L2 tag array and L2 data array. If a search of the L2 tag array indicates that the requested information is in the L2 data array, the information is returned from the L2 data array to the processor. If such a search indicates that the requested information is not in the L2 data array, then the request is forwarded to the next level in the memory hierarchy, which may be another cache or may be the system RAM.

DETAILED DESCRIPTION

The methods and apparatus described here provide a multilevel cache system that has multiple data arrays and a single merged tag array. Such an arrangement improves the speed of the cache system, thus improving overall system performance, and reduces the size of the cache system.

Figure 1:
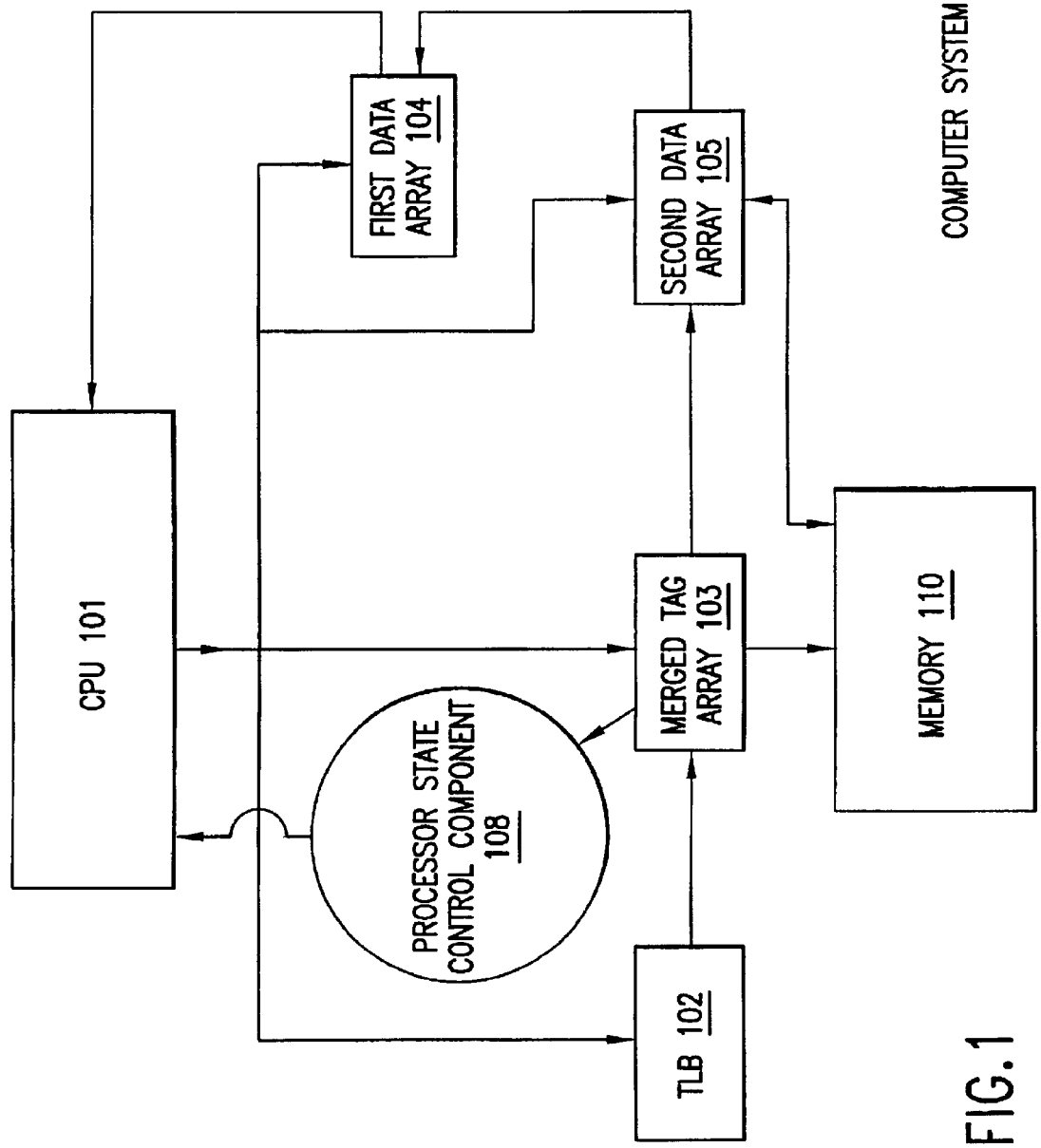
FIG. 1 is a partial block diagram of a computer system that has a multilevel cache system with a single TLB and a merged tag array according to one embodiment of the present invention.

FIG. 1 shows a computer system 100 that contains an embodiment of the multilevel cache system of the present invention. The computer system 100 may include a central processing unit (CPU) 101 which may be coupled to a TLB 102, a merged tag array 103, a first data array 104, and a second data array 105. In addition, the TLB 102 may be coupled to the merged tag array 103, the merged tag array 103 may be coupled to the second data array 105, and the second data array 105 may be coupled to the first data array 104. Computer system 101 also may contain a processor state control component 108, which may be coupled to the CPU 101 and to the merged tag array 103, and may contain a memory 110 coupled to the merged tag array 103 and the second data array 105. The term "coupled" is intended to encompass and be broader than the term "directly connected." If A is directly connected to B, and B is directly connected to C, then A is said to be "coupled" to C. In other words, the term coupled includes the term "indirectly connected."

In one embodiment, memory 110 is a system RAM memory. In another embodiment, memory 110 may be a third level cache, which in turn may be coupled to a system RAM.

Processor state control component 108 may be a circuit designed to store one or more instructions, as well as associated data and control information, that have been issued by the processor but have not yet been retired. That is, processor state control component 108 may be used to preserve the architectural state of the system, for example after the issuance of an instruction which may latter be determined to have been improper or where a speculative branch was taken that is latter determined to have been incorrect. In such a case, processor state control component 108 may flush the improper instruction and all younger instructions to return the processor to the architectural state (e.g., the register values) it was in prior to the issuance of the improper instruction. For example, processor 101 may issue an ADD that causes an overflow or may issue an instruction that has an illegal opcode, in which case processor state control component 108 may be used to return the processor to the architectural state it was in prior to issuance of the improper instruction. Processor state control component 108 may contain memory and control logic. In one embodiment, processor state control component 108 may be part of CPU 101.

In one embodiment, the first data array is an SRAM that is 16 KiloBytes (KB) in size, the second data array is an SRAM that is 256 KB in size, and memory 110 is a DRAM memory that is 64 Megabytes (MB) in size. First data array 104 and second data array 105 may contain instructions, data, or both. In one embodiment, TLB 102 is a single level translation lookaside buffer that contains all the available memory address translations for the CPU 101. TLB 102 may contain, for example, 512 entries.

Merged tag array 103 may be a RAM memory. The merged tag array 103 may be configured to contain directory information for the first data array 104 and second data array 105. As discussed below, merged tag array 103 may contain tags for multiple data arrays. For example, it may contain the tags for first data array 104 and second data array 105. One embodiment of an entry in merged tag array 103 is discussed below with reference to FIG. 3.

Figure 2:
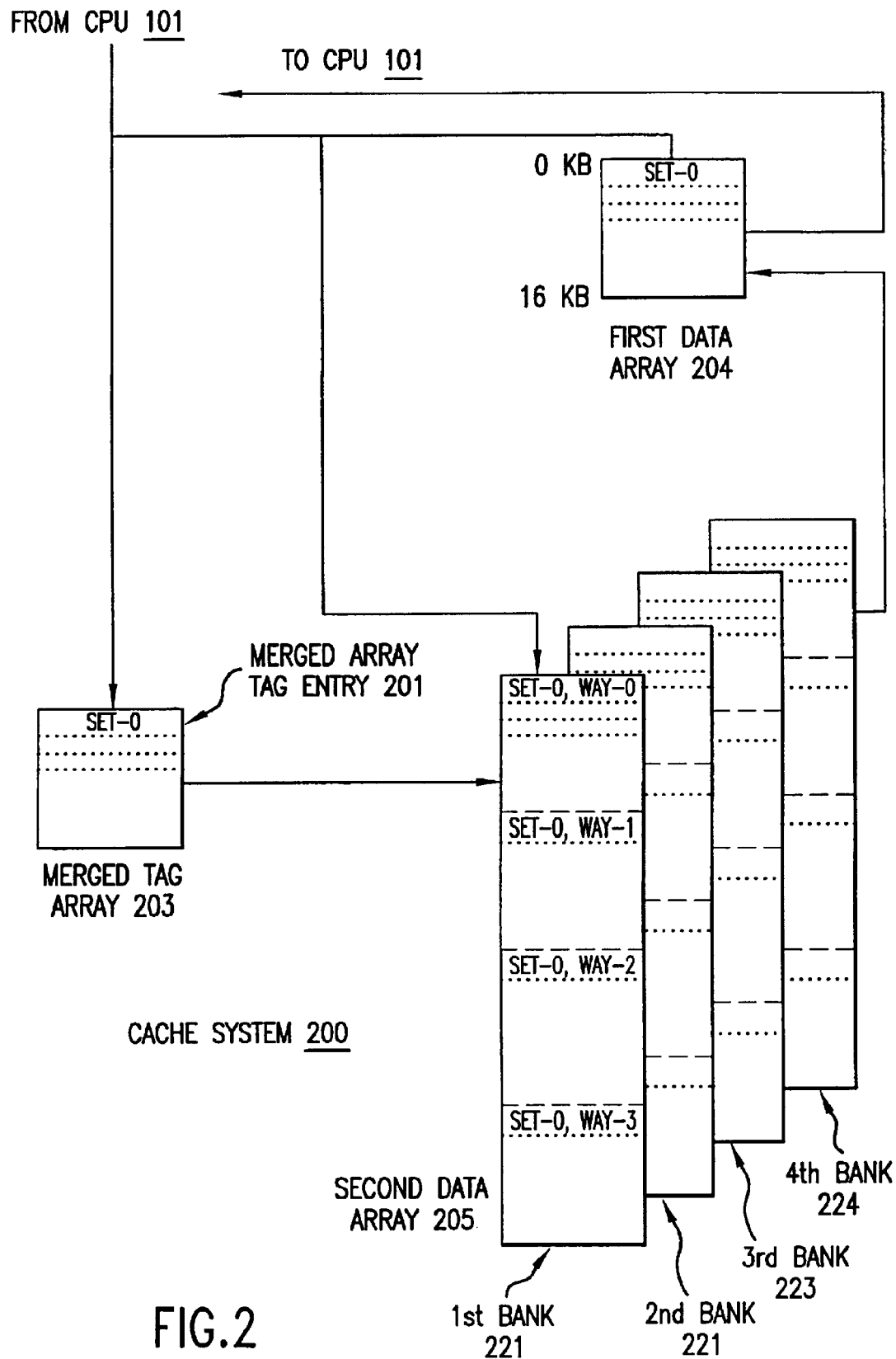
FIG. 2 is a partial block diagram of a cache system that has a merged tag array according to one embodiment of the present invention.

FIG. 2 shows a partial block diagram of a cache system that has a merged tag array 203, a first data array 204, and a second data array 205 according to one embodiment of the present invention. Merged tag array 203, first data array 204, and second data array 205 may be the same as merged tag array 103, first data array 104, and second data array 105 shown in FIG. 1. As shown in FIG. 1, merged tag array 203, first data array 204, and second data array 205 may all be coupled to a CPU (not shown in FIG. 2), merged tag array 203 may be coupled to second data array 205, and second data array 205 may be coupled to first data array 204.

In one embodiment, each entry (line) in first data array 204 and second data array 205 contains 64 bytes of information. If the first data array is 16 KB and the second data array is 256 KB, as discussed above, then the second data array has 1 K entries and is sixteen times as large as the first data array. FIG. 2 shows a 16 KB first data array 204 and a 256 KB second data array which has four 64 KB banks. In one embodiment, the first level data array 204 is a direct mapped cache. Thus, for every set (entry) in first data array 204 there is a corresponding set (entry) in merged tag array 203. For example, tag array entry 201 in merged tag array 203 (which is set-0 in the merged tag array) corresponds to the set-0 entry of first data array 204 (i.e., tag array entry 201 may contain a tag for set-0 of first data array 204). Second level data array 205 may have any one of the various types of set-associativity architectures, and may be for example a direct mapped data array. In the embodiment shown in FIG. 2, second data array 205 is a four-way set-associate cache. Thus, each entry in merged tag array 203 may correspond to sets in each of the four ways in second data array 205. In FIG. 2, each bank (e.g., the 1$^{st}$ bank 221, 2$^{nd}$ bank 222, 3$^{rd}$ bank 223, 4$^{th}$ bank 224) is divided into four ways. For example, tag array entry 201 may corresponds to, and contain tags for, set-0 of way-0, set-0 of way-1, set-0 of way-2, and set-0 of way-3 in each bank. Thus, there may be 16 possible corresponding entries in second data array 205 for each first data array 204 entry. In one embodiment, merged tag array 203 has four banks and each entry in merged tag array 203 may correspond to four entries in second data array 205 (one for each way).

Figure 3:
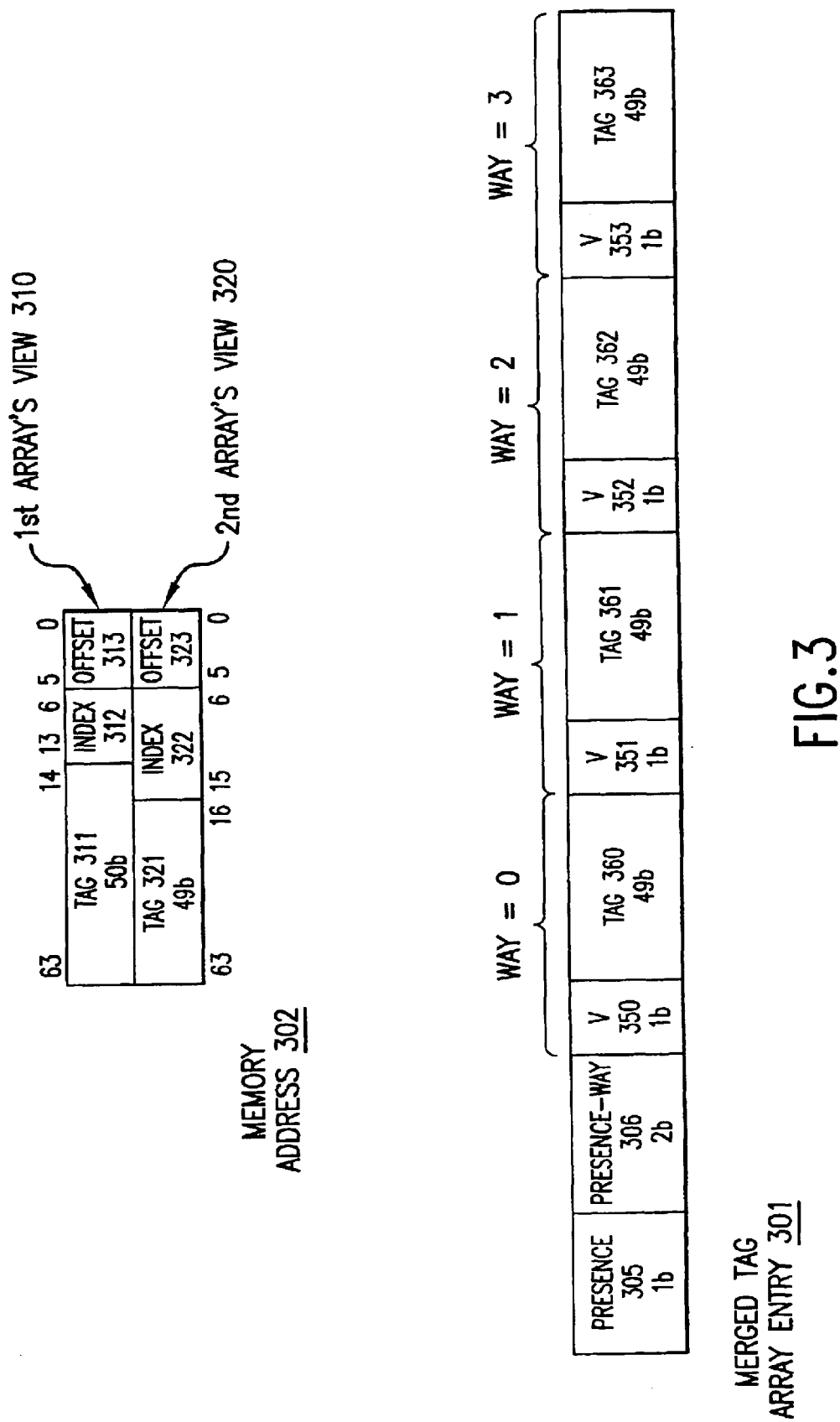
FIG. 3 is a partial block diagram of a memory address and a merged tag array entry for a computer system that has a multilevel cache system according to one embodiment of the present invention.

FIG. 3 shows a partial block diagram for a merged tag array entry 301 and a memory address 302 for a computer system that has a multilevel cache system according to one embodiment of the present invention. For the purpose of this discussion, tag array entry 301 may be assumed to be the same as array entry 201 of FIG. 2. In this embodiment, the address space for memory address 302 is 64 bits. Memory address 302 may be an address for a location in system memory. It may be viewed differently by a first array and second array. According to a first array view 310, bits 0–5 may be an offset 313, bits 6–13 may be an index 312 into a first tag array, and bits 14–63 may be a tag 311 for a first tag array. According to the second array view, bits 0–5 may be an offset 312, bits 6–15 may be an index 322 into a second tag array, and bits 16–63 may be a tag 321 for a second tag array. In other embodiments, the size of memory address and tag array entry and/or the size of these fields may vary. As will be discussed below, when a merged tag array is used according to the present invention, the memory address fields may be viewed differently than when an arrangement is employed that has a first tag array and second tag array.

Merged tag array entry 301 may contain a plurality of directory fields that contain information about the contents of a corresponding set in the first data array or second data array. In FIG. 3, merged tag array entry 301 contains a presence field 305, a presence-way field 306, and four pairs of valid (V) and tag fields. In this embodiment, the presence field is 1 bit, the presence-way field is 2 bits, each valid field is 1 bit, and each tag field is 49 bits. Using the example discussed above, merged tag array entry 301 may contain the tags for a four-way set-associative second data array 205. In this example, each pair (valid field, tag field) in tag array entry 301 corresponds to a way of second data array 205. Thus, valid field 350 and tag field 360 correspond to way-0 of second data array 205, valid field 351 and tag index field 361 correspond to way-1, ext. In this embodiment, the size of the tags 360, 361, 362, and 363 is the same as that of tag 321 of memory address 302. In addition, in this embodiment the bits 6–13 of index 322 may be used to identify an entry in merged tag array 203, and bits 14–15 of tag 322 may be used to select a bank of second data array 205. Thus, bits 6–13 may identify a set in the merged tag array, while bits 14–15 may identify a bank in the second data array (and also in the second data array). In other embodiments, the size of the fields in tag array entry 301 and the number of ways addressed may vary, for example based on the size and number of ways in the data arrays.

Figure 4:
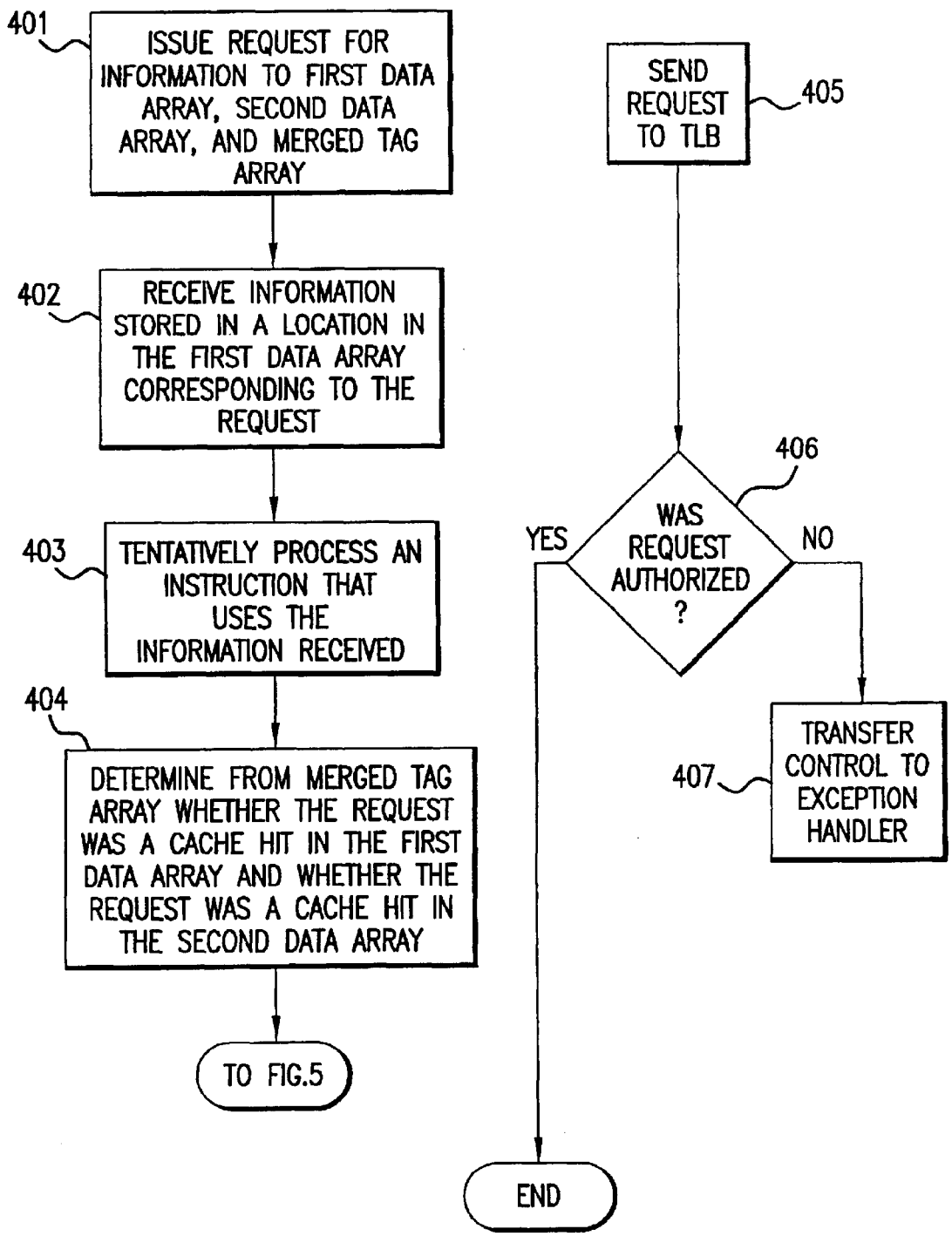
FIG. 4 is a flow chart that shows one embodiment of a method of retrieving data from a multilevel cache system according to the present invention.

FIG. 4 is a flow chart that shows one embodiment of a method of retrieving data from a multilevel cache system according to the present invention. According to this method, a request for information is issued (401) to a first data array, a second data array, and a merged tag array at substantially the same time. For example, the request might be issued by CPU 101 of FIG. 1 to first data array 104, second data array 105, and merged tag array 103. The request may be generated by an instruction, such as a load instruction. Typically, the request might specify an address in a memory (such as a system RAM) where the information is stored. Information stored in a location in the first data array corresponding to the request is received (402), and one or more instructions that use the information received are processed tentatively (403). For example, the request may be for information in a certain memory address, and the first data array will have a location (i.e., a line) corresponding to that memory location. Assuming for example that the instruction was LOAD a register with the data from a certain memory location (e.g., LD B [100]), then the first data array would supply the information stored in the data array set that corresponds to the memory location (e.g., memory location 100).

The instructions may be allowed to use the data unconditionally but, because the data is tentatively processed, the system state (or architectural state) is not yet modified. That is, the instruction is not retired. If the instruction were to LOAD register B from a memory location 100, as in the example above, then the instruction and the information retrieved from the location in the first data array may be stored in a buffer. Later, instructions in the stream may then be tentatively processed. As discussed above, a location in the first data array corresponds to the memory location from which the information was requested. However, the first data array location may correspond to multiple memory locations. Thus, the information received from the first data array may, or may not, correspond to the information in the requested memory location. If the first data array location does contain a copy of the information in the requested memory location, a cache hit occurs in the first data array. If the first data array location does not contain a copy of the information in the requested memory location, a cache miss occurs. Because the validity of the data retrieved from the first data array has not yet been confirmed, the processor executes the instructions in a tentative mode. Based on the request received, the merged tag array determines whether the request was a cache hit in the first data array and whether the request was a cache hit in the second data array (404).

Figure 5:
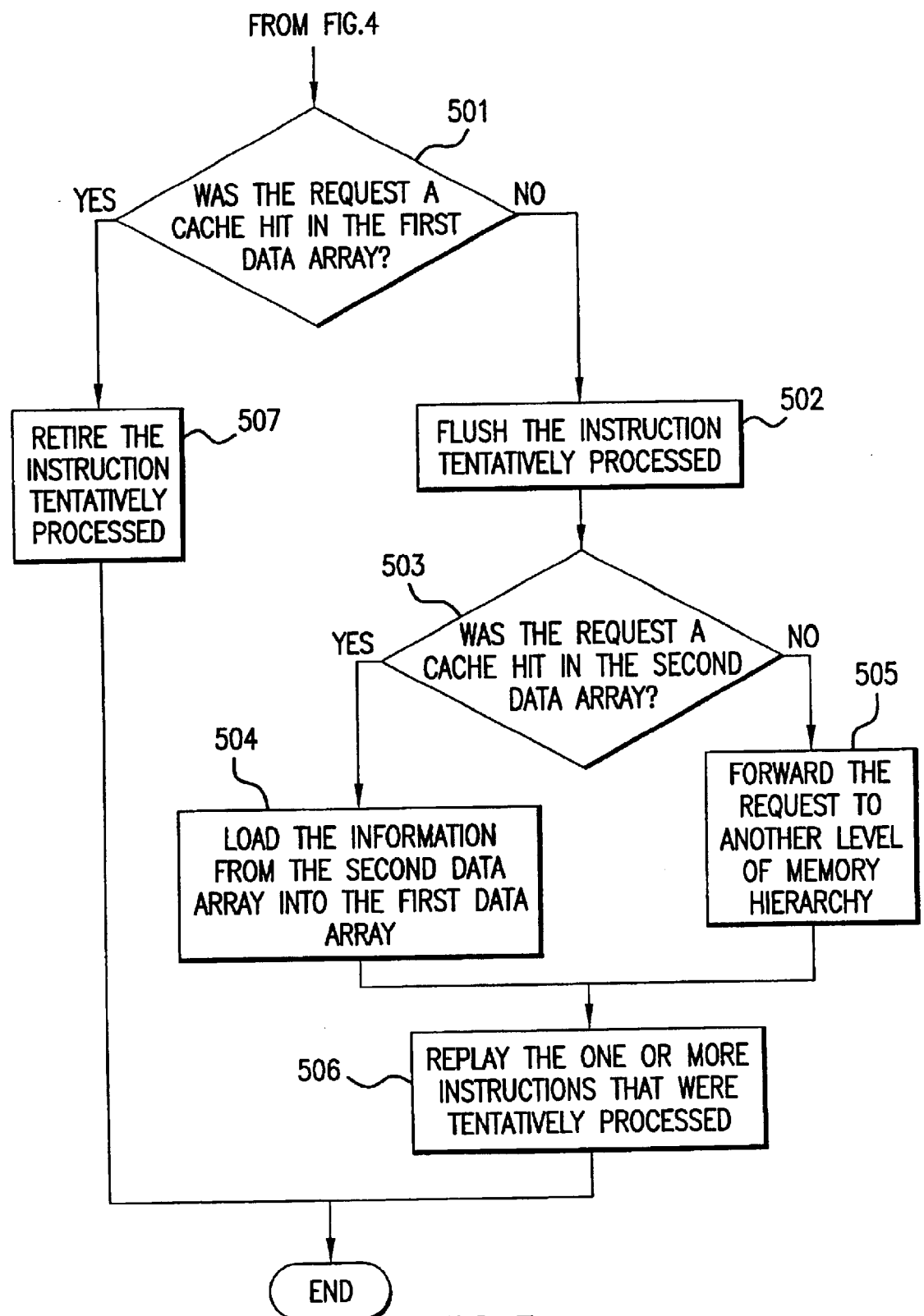
FIG. 5 is a flow chart that shows one embodiment of a method of retrieving data from a multilevel cache system that may be used in addition to the method shown in FIG. 4.

FIG. 5 is a flow chart that shows one embodiment of a method of retrieving data from a multilevel cache system that may be used in addition to the method of FIG. 4. If the request was a cache hit in the first data array (501), the one or more instructions tentatively processed may be retired (507). In the case where it was determined that there was a cache miss in the first data array (501), the instruction tentatively processed may be flushed (502). If later instructions in the stream were also tentatively processed, they may also be flushed. If the merged tag array determined that the request was a cache hit for the second data array (503), the information from the set in the second data array that corresponds to the memory location requested may be loaded into the corresponding location in first data array (504). If the request was a cache miss in the second data array, the request may be forwarded to another level of memory hierarchy, such as another cache or a system memory (505). In either case, when it was determined that there was a cache miss in the first data array, the one or more instructions that were tentatively processed may be replayed (506).

Figure 6:
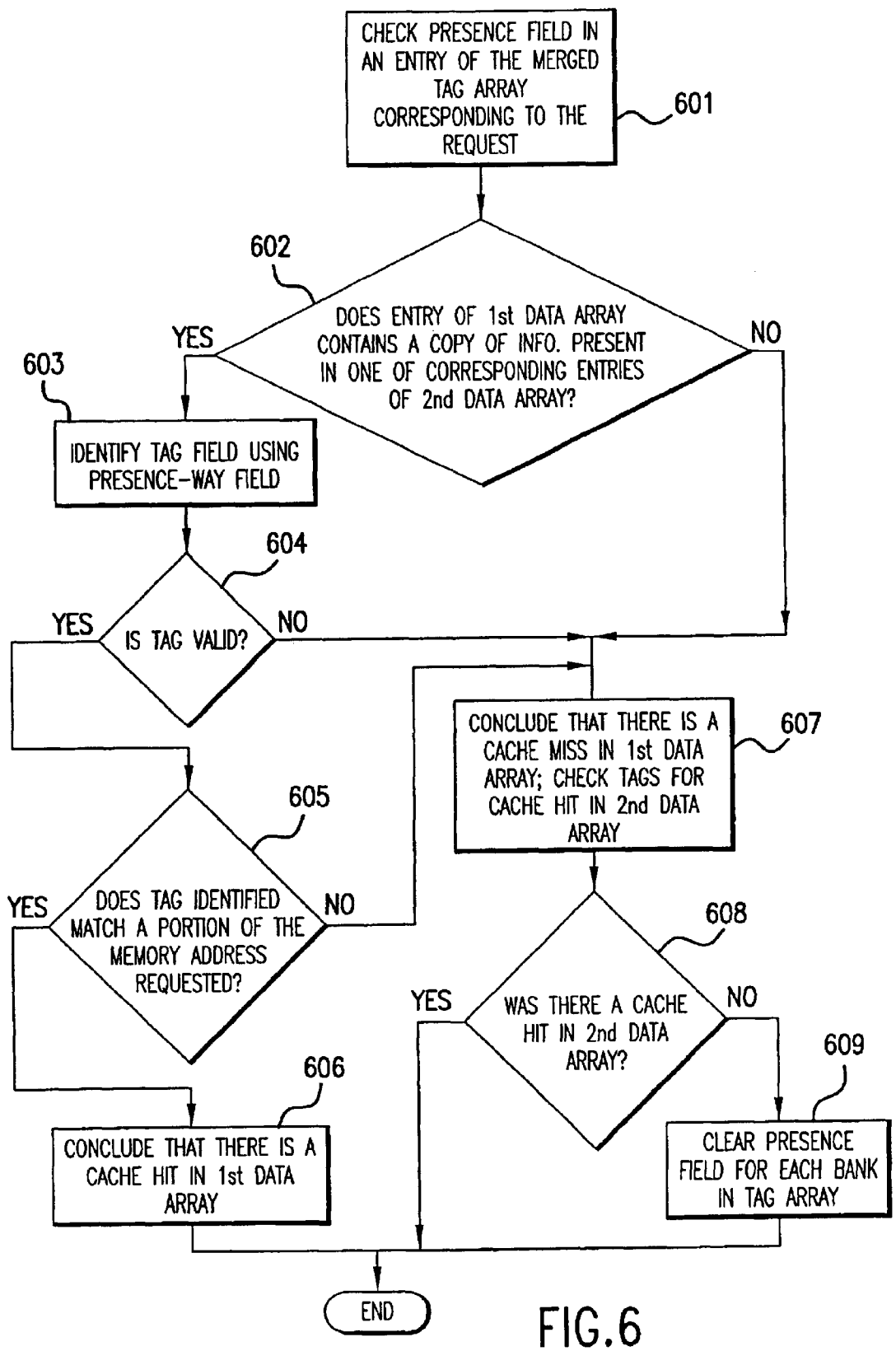
FIG. 6 is a flow chart that shows one embodiment of a method for determining if the request generated a cache hit or miss for the first data array and second data array.

FIG. 6 shows one embodiment of a method for determining if the request generated a cache hit or miss for the first data array and second data array. According to this embodiment, the determination is made by checking a presence field, presence-way field, and the valid/tag fields in the merged tag array entry corresponding to the memory request. For example, with reference to FIGS. 2–3, if a memory request maps to cache set-0, then the merged tag array entry 201/301 may be examined.

First, it may be determined whether there is a cache hit in the first data array. In one embodiment, there would only be a hit in the first data array if there is also a hit in the second data array. Thus, this embodiment determines whether there is a hit in the first data array by determining whether a corresponding entry is a hit in the second data array. According to this embodiment, the presence field in the tag array entry is checked (601–02). It will have been "set" if a first data array set corresponding to the request contains a copy of information present in a corresponding second data array set. For example, the presence field 305 may be "set" in tag array entry 201/301 if the set-0 entry in data array 204 contains data from the same memory location as one of the set-0 entries in second data array 205 (e.g., set-0 way-0 in second data array 205, set-0 way-1 in second data array 205, ext).

If the presence field is "set", it still must be determined which set in the second data array contains a copy of the same information as the set in the first data array, and whether the entry in the second data array that corresponds to first data contains a copy of the data in the memory location requested. That is, it must be determined whether the corresponding second data array entry is a hit. As discussed above, there may be multiple entries (e.g., one for each way) in the second data array 205 that correspond to a given set in first data array 204. In this embodiment, the presence-way field 306 contains a value that identifies which (if any) second data array way corresponds to the first data array set (603). For example, presence-way field 306 may indicate that the information in set-0 of first data array 204 may correspond to the information in set-0, way-1 of second data array 205. To determine if the information in the second data array set pointed to by the merged tag array set is the same as the information in the requested memory location, the valid field and tag field pointed to by the presence-way field may be checked (604–05). Using the example above, if the appropriate way is way-1, then the valid field 351 may be checked to determine if tag 361 is valid. If it is valid, then tag 361 may be compared against the tag portion of the memory address, such as tag index 321 of memory address 302. If there is a match, then there is a cache hit in the second data array. Because the presence field for this tag entry was "set", and the presence-way pointed to this tag, then the matching of the tag to the memory address means that there is also a hit in the first data array (606). If the merged tag array has four banks, then all four banks should be checked.

If for a given tag array entry either the presence field is not "set", or the presence-way field points to a way in the tag array entry with an "unset" valid field or a tag field that does not match the memory addresses tag index portion, then there is a miss in the first data array (607). In the example above, there is a miss in the first data array if the presence bit 305 in tag array entry 301 is not "set". In addition, if the presence-way field 306 points to valid field 351 and tag field 361, and either the valid field is "unset" or the tag in tag field 361 does not match the tag index portion of the memory address (e.g., tag index 312), then there is a miss in the first data array. However, it still must be determined whether there is a hit in the second data array. To make this determination, the other tag valid field/tag field pairs must be checked to determine if there is a match in any of the other ways of the second data array. A tag hit in the second data array has occurred if there is a match against a valid tag. If there are no matches against any of the valid tags, then a tag miss in the second data array has occurred. If there is a miss in the first data array, then the tags in the merged tag may be checked to see if there is a hit in the second data array (607–308). If there is a miss in the second data array, and the merged tag array contains a number of banks, then the presence field for each bank (e.g., modulo 256 if the size of each bank is 256 entries) is cleared.

The method described above may be performed in any order. For example, in another embodiment, whether there is a hit in the second data array may be determined before determining whether there is a hit in the first data array. In another embodiment, for example, the presence field may be checked last.

According to a further embodiment of the current invention, when a request for information is issued to a first data array, a second data array, and a tag array at substantially the same time (e.g., 401 of FIG. 4), the request may also issue to a translation lookaside buffer (TLB) at substantially the same time (405). The processor assumes that the TLB has the desired information and uses the data returned from the first level tag array. If it is later determined by the merged TLB that the request was not authorized (406), then the processor state control component may transfer control to an exception handler (407). In an embodiment, if it is determined by the TLB that a valid translation is not present, then the processor state control component flushes the improper instructions, as discussed above, and returns the processor to the architectural state it was in prior to issuance of the improper instruction. The processor state control component does not retire instructions until the TLB determines that they are valid.

Figure 7:
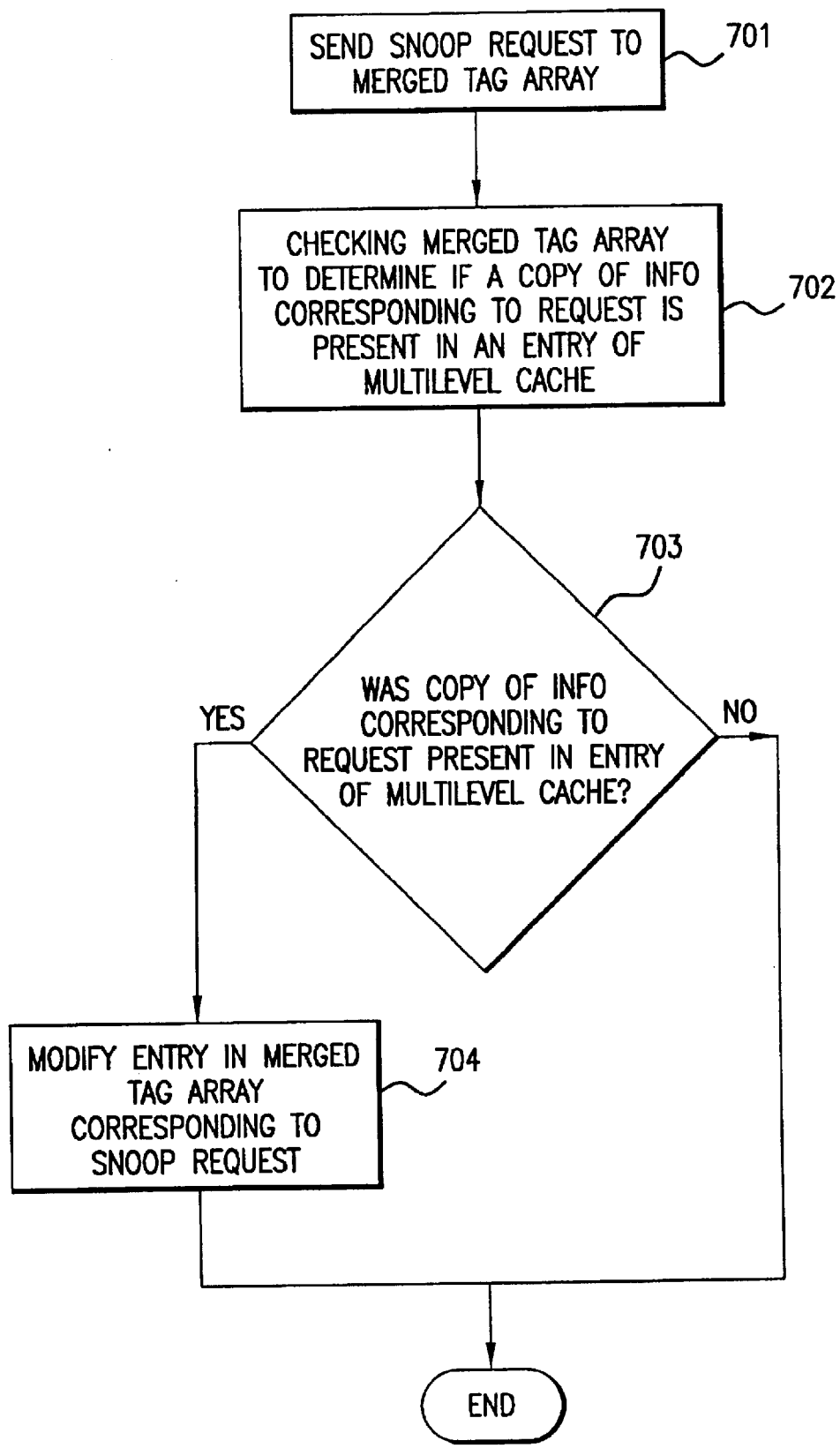
FIG. 7 is a flow chart that shows a method of snooping a multilevel cache system according to an embodiment of the present invention.

FIG. 7 is a flowchart that shows a method of snooping a multilevel cache system according to an embodiment of the present invention. Such a method may be used for example by a processor other than CPU 101 that uses a common system memory device to determine if the one of the caches associated with CPU 101 contains a copy of information from a memory location that the other CPU wishes to modify. According to one embodiment of the method for snooping the multilevel cache, a snoop request is sent to a merged tag array (701), for example by a processor other than CPU 101. The merged tag array is checked to determine if a copy of information corresponding to the snoop request is present in an entry of the multilevel cache (702). If a copy of the information corresponding to the snoop request is present in an entry of the multilevel cache (703), the entry of the merged tag array corresponding to the request is modified to invalidate the entry (704). For example, the multilevel cache may contain at least a first level data array and a second level data array, with the second level data array containing a plurality of ways and each entry of the merged tag array containing a valid field for each way corresponding to the entry. If in this example merged tag array entry 301 of FIG. 3 were the tag entry in the merged tag array corresponding to the entry where the information is found in the second data array, and if the information were found in way-0, then presence field 305 may be "set" to invalid and the valid field 201 is "set" to invalid.

Embodiments of the present invention provide a multilevel cache system that has multiple data arrays and a single merged tag array. Such a cache system allows cache accesses in the aggregate to be achieved at an improved speed, thus improving overall system performance, and reduces the size of the cache system. A first level data array is allowed to complete the look-up prior to determining whether there is a cache hit and the data retrieved is used on a speculative basis. If it is later determined that the request to the first level data array was a cache miss, the instructions that were tentatively performed are flushed and loaded into the first level cache from a second level cache, or the data request may be forwarded to another level of the memory hierarchy.

Several embodiments of the present invention are specifically illustrated and/or described herein. However, it will be appreciated that modifications and variations of the present invention are covered by the above teachings and within the purview of the appended claims without departing from the spirit and intended scope of the invention. For example, although the multilevel cache shown in the embodiments disclosed only has two levels, in further embodiments there may be three or more data arrays. In addition, although the embodiments show first and second level data arrays with a certain size and organization, the data arrays may be of any size and the data arrays other than the first level data array may have any type of organization. Further, the data arrays may use any type of coherency protocol.

What is claimed is:

1. An apparatus comprising:
    a first data array;
    a second data array coupled to the first data array; and
    a merged tag array coupled to the second data array, wherein the merged tag array is to store a plurality of entries that each contain directory information for the first data array and the second data array.

2. The apparatus of claim 1, wherein the merged tag array is further coupled to a processor state control component.

3. The apparatus of claim 1, wherein:
    the first data array contains a plurality of sets and the second data array contains a plurality of sets;
    each merged tag entry corresponds to a set in the first data array and to one or more sets in the second data array; and
    each of the plurality of entries in the merged tag array contains a presence field indicating whether the corresponding set in the second data array contains a copy of information present in a corresponding set in the first data array.

4. The apparatus of claim 3, wherein:
    the second data array further contains a plurality of ways;
    each merged tag array entry further contains a presence-way field and a plurality of tag fields, each tag field corresponding to a second data array way; and
    each presence-way field indicates which, if any, second data array way contains a copy of information present in a corresponding set in the first data array.

5. The apparatus of claim 4, further comprising a single level translation lookaside buffer coupled to the merged tag array, wherein the single level translation lookaside buffer contains all available memory address translations.

6. A merged tag array comprising a plurality of entries, wherein each of said entries comprises:
    a first directory field to contain information about the contents of a corresponding set in a first data array; and
    a second directory field to contain information about the contents of a corresponding set in a second data array.

7. The merged tag array of claim 6, wherein:
    the first directory field comprises a presence field to indicate whether a corresponding set in the first data array contains the same information as a corresponding set in the second data array; and
    the second directory field comprises a tag field corresponding to sets in the second data array.

8. The merged tag array of claim 7, wherein:
    the second data array contains a plurality of ways;
    each entry in the merged tag array contains a plurality of second directory fields, each of which correspond to a different way in the second data array; and
    each entry in the merged tag array further contains a presence-way field to indicate which way in the second data array contains a copy of information present in a corresponding set in the first data array.

9. A system, comprising:
    a first level cache array to store data;
    a second level cache array to store data, wherein the second level cache array is coupled to the first level cache array; and a third array to store tags for both the first level cache array and the second level cache array.

10. The system of claim 9, wherein a tag stored in the third array identifies the contents of a set in the first level cache array and the second level cache array.

11. The system of claim 9, wherein the third array is configured to contain a plurality of entries, and wherein each entry in the third array contains a presence bit to indicate whether a corresponding set in the first level cache array contains the same information as a corresponding set in the second level cache array.

12. The system of claim 11, wherein the second level cache array contains a plurality of ways, and wherein each entry in the third array contains a presence-way bit to indicate which way in the second level cache array, if any, contains information that is present in a corresponding set in the first level cache array.

13. A method comprising:
  issuing a request for information to a first data array, a second data array, and a merged tag array, wherein the merged tag array stores directory information for the first data array and the second data array;
  determining from the merged tag array whether the request generated a cache hit in the first data array or second data array; and
  providing information from the first data array or second data array based on the results of said determination.

14. The method of claim 13, wherein determining if the request generated a cache hit for the first data array comprises:
  checking a presence field in an entry of the merged tag array corresponding to the request to determine if a corresponding set of the first data array contains a copy of information present in one of the corresponding sets of the second data array; and
  determining if a copy of the requested information is contained in a set of the second data array that both corresponds to the request and contains a copy of the information present in a corresponding set of the first data array.

15. The method of claim 14, wherein:
  the second data array contains a plurality of ways; and
  determining if a set in the second data array contains a copy of the information present in a corresponding set of the first data array comprises determining if a tag identified by a presence-way field matches a portion of the memory address requested.

16. The method of claim 13, further comprising:
  sending the request for information to a single level translation lookaside buffer at substantially the same time as it is sent to the first data array, second data array, and merged tag array, wherein the single level translation lookaside buffer contains all available memory address translations;
  checking the single level transaction lookaside buffer to determine whether the request is authorized; and
  transferring control to an exception handler if the request is not authorized.

17. A system comprising:
  a central processing unit;
  a first data array coupled to the central processing unit;
  a second data array coupled to the central processing unit and the first data array;
  a merged tag array coupled to the central processing unit and the second data array, wherein the merged tag array is to store a plurality of entries that each contain directory information for the first data array and the second data array; and
  a system random access memory coupled to the merged tag array and the second data array.

18. The system of claim 17, wherein the central processing unit includes a processor state control component.

19. The system of claim 17, wherein the system further comprises a merged translation lookaside buffer coupled to the merged tag array.

* * * * *